United States Patent

Martin et al.

[11] Patent Number: 5,374,017
[45] Date of Patent: * Dec. 20, 1994

[54] CABLE FITTING

[76] Inventors: William B. Martin, 772 Twin View Pl., Pleasant Hill, Calif. 94523; John W. Martin, 743 Santa Anna Dr., Pittsburg, Calif. 94565; Mark L. Bryan, 2700 Bayberry Dr., Lodi, Calif. 95242

[*] Notice: The portion of the term of this patent subsequent to Jun. 2, 2009 has been disclaimed.

[21] Appl. No.: 879,353

[22] Filed: May 7, 1992

Related U.S. Application Data

[63] Continuation-in-part of Ser. No. 485,545, Feb. 27, 1990, Pat. No. 5,118,057, which is a continuation-in-part of Ser. No. 311,750, Feb. 17, 1989, Pat. No. 4,919,370.

[51] Int. Cl.$^5$ .................................................. F16L 5/00
[52] U.S. Cl. ................................. 248/56; 174/153 G; 248/73
[58] Field of Search ............... 248/56, 68.1, 73, 74.1, 248/74.2, 316.2; 174/65 G, 153 G; 24/713.6, 713.2; 439/459, 460, 470

[56] References Cited

U.S. PATENT DOCUMENTS

| | | | |
|---|---|---|---|
| 2,420,826 | 5/1947 | Irrgang . | |
| 2,897,533 | 8/1959 | Bull et al. . | |
| 2,920,129 | 1/1960 | Rapata | 174/153 G |
| 2,948,773 | 8/1960 | Hawes . | |
| 3,300,163 | 1/1967 | Randolph | 248/56 |
| 3,424,856 | 1/1969 | Coldren . | |
| 3,493,205 | 2/1970 | Bromberg | 248/56 |
| 3,506,999 | 4/1970 | Neher . | |
| 3,562,847 | 2/1971 | Jemison | 248/56 |
| 3,564,113 | 2/1971 | Kindler . | |
| 3,991,446 | 11/1976 | Mooney et al. . | |
| 4,000,875 | 1/1977 | Jemison et al. | 248/56 |
| 4,056,252 | 11/1977 | Simon | 248/56 |
| 4,142,064 | 2/1979 | Thomsen . | |
| 4,188,003 | 2/1980 | Ramsey | 248/56 |
| 4,190,222 | 2/1980 | Appleton et al. | 248/56 |
| 4,262,409 | 4/1981 | Madej . | |
| 4,299,363 | 11/1981 | Datschefski | 284/56 |
| 4,350,839 | 9/1982 | Lass . | |
| 4,361,302 | 11/1982 | Lass | 248/56 |
| 4,366,343 | 12/1982 | Slater et al. . | |
| 4,474,489 | 10/1984 | Simon . | |
| 4,919,370 | 4/1990 | Martin et al. | 248/56 |
| 5,014,938 | 5/1991 | Potzas | 248/56 |
| 5,072,910 | 12/1991 | May | 248/412 |
| 5,118,057 | 6/1992 | Martin et al. | 248/56 |

FOREIGN PATENT DOCUMENTS

| | | |
|---|---|---|
| 2295287 | of 1968 | France . |
| 2316747 | 10/1974 | Germany . |
| 2700389 | 7/1978 | Germany . |
| 2822643 | 11/1979 | Germany . |
| 152065 | 10/1955 | Sweden . |
| 1122395 | 8/1968 | United Kingdom . |

Primary Examiner—Ramon O. Ramirez
Assistant Examiner—Derek J. Berger
Attorney, Agent, or Firm—Wigman, Cohen, Leitner & Myers

[57] ABSTRACT

The present invention is directed to a cable fitting for insertion in a protective enclosure. The fitting includes one or more cable channels and is constructed of a first staging portion for attachment to the electrical enclosure and a second portion which incorporates strain relief features with gripping teeth for clamping the cable. The fitting is designed for use with one or more cables. In use, it is installed in the panel to the staging position depth, the cable or cables are inserted through the fitting and the panel into the box to the desired position for clamping, and the fitting is inserted into the panel to the installed position to lock the fitting to the box and to clamp the cable within the fitting. The fitting may also be fully inserted and the cable or cables installed thereafter.

20 Claims, 5 Drawing Sheets

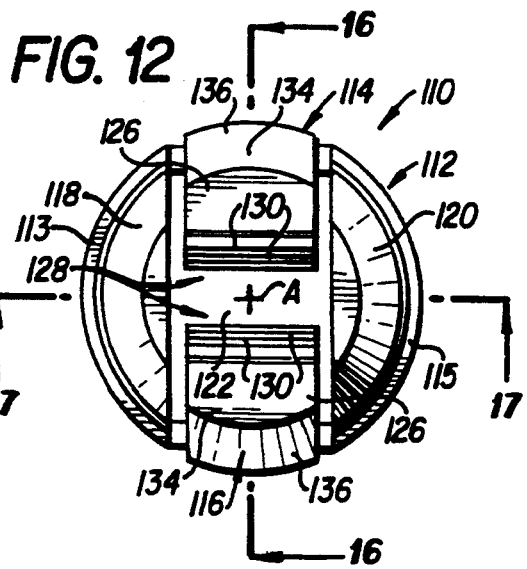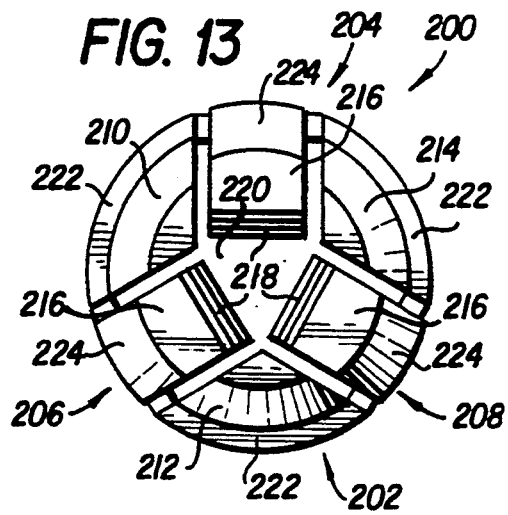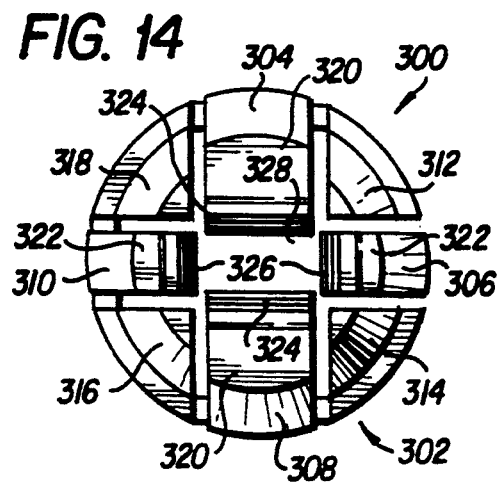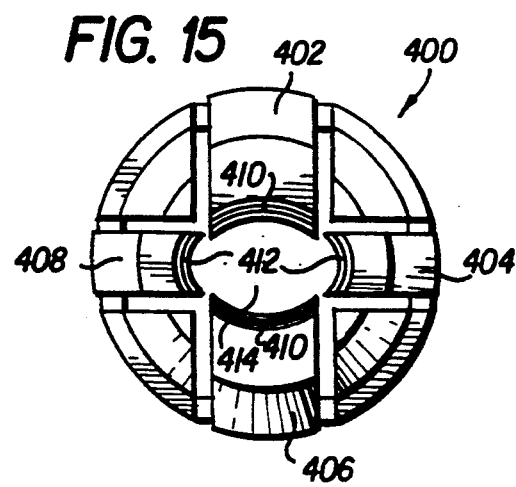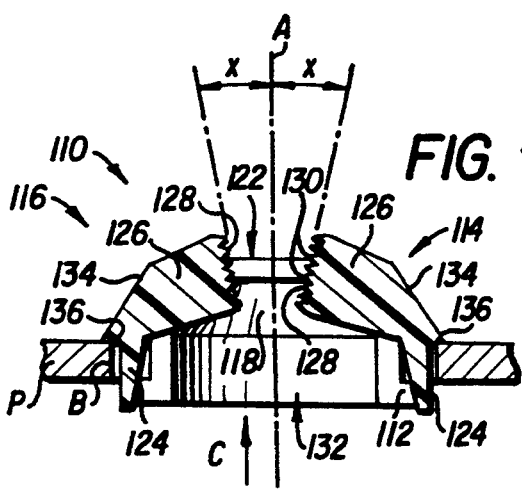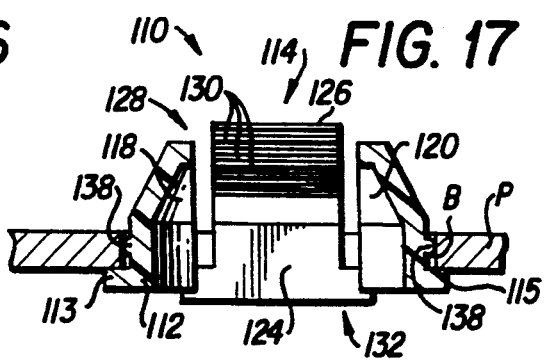

CABLE FITTING

CROSS-REFERENCE TO RELATED APPLICATIONS

This application is a continuation-in-part of U.S. patent application Ser. No. 07/485,545, filed Feb. 27, 1990, now U.S. Pat. No. 5,118,057 which is a continuation-in-part of U.S. patent application Ser. No. 07/311,750, filed Feb. 17, 1989, now U.S. Pat. No. 4,919,370.

FIELD OF THE INVENTION

The present invention is directed to a cable fitting for securing at least one cable, such as nonmetallic (NM) sheath conductor cable through an aperture in the wall of a protective enclosure panel. More specifically, the present invention is generally directed to inexpensive, labor-saving protective cable fittings for inserting and securing at least one and preferably two electrical or other cables into the panel. When fully installed, the cables may not easily be withdrawn from the panel. The fitting is capable of withstanding considerable withdrawal force without destruction of the fitting or tearing of the cable covering jacket.

BACKGROUND OF THE INVENTION

Insulating bushings and interconnection box cable connecting fittings are well known in the prior art, as illustrated by U.S. Pat. Nos. 2,948,973 to Hawes; 3,424,856 to Coldren; 3,991,446 to Mooney et al; 4,262,409 to Madej; 4,299,363 to Datschefski; 4,350,839 to Lass; 4,366,343 to Slater; 4,474,489 to Simon; and particularly 3,493,205 to Bromberg. The Hawes, Coldren, Mooney et al, Datschefski, Simon, and Bromberg patents are all directed to fittings for installing and securing single sheathed cables to an electrical panel. The sheathed cables may each include multiple conductors and typically may include an outer plastic protective shield. None of these prior art fittings are specifically designed for safely securing two or more cables, such as nonmetallic sheathed cables, to the panel. None provide a plurality of generally rectangular channels, each for housing one or more cables. Among these prior art patents, the Slater 4,366,343; the Madej 4,262,409; and the Lass 4,350,839 patents disclose devices with structure that permits relatively unrestricted cable entry, but positively inhibits cable withdrawal. Of these, the Slater 4,366,343 device is an integral portion of the panel (and is thus difficult and expensive to mold). The Lass device requires non-standard rectilinear holes in the enclosure, and the Madej device is an essentially 3-piece molding having a split base portion; the latter is both difficult and expensive to mold, and is structurally weak around the periphery of its split base portion.

Also, U.S. Pat. Nos. 4,000,875 to Jemison et al and 4,190,222 to Appleton et al, and British Patent No. 1,122,395 to Griffiths include primitive features which are improved upon by the present invention. The Appleton et al and Jemison et al patents both disclose fittings or bushings which utilize a cammed head to clamp a single cable within the bushing. The cam head of Appleton et al is rotatably mounted in the bushing with a pair of radially extending transverse axle shafts, forming a two-piece construction, while Jemison et al relies on a flexible hinge of the same material as that of the bushing. Additionally, Jemison et al incorporates a toothed surface on the cable engaging cam head surface, while Appleton et does not include such a feature. Both teach the use of a single cam head. Both are positively forced into gripping relationship with the cable; neither permits a straight-through cable design, as both deflect the cable from its normal path in order to position it relative the cam head and another member for engagement. The Griffiths design is intended for mounting in a square hole, though current wiring practices are directed to round holes; while it may be adaptable for anti-withdrawal of a cable therein, the fitting and connector are to be inserted in the mounting hole together rather than permitting independent insertion.

The Appleton et al and Jemison et al fittings are believed to be incapable of meeting the present Underwriters' Laboratories standards which requires gripping of the cable sheath without tearing it when the cable is subjected to certain tension forces, and without tearing apart of the fitting.

Great quantities of such cable fittings are required in wiring commercial and residential structures; thus they must be safe, durable, and inexpensive, and they should be easily installed without special tools or without involving additional labor. Multiple piece fittings are typically more expensive to mold than single piece fittings and are also typically more difficult and cumbersome to install, thus adding to their installed cost. It is preferred that cable fittings easily accept insertion of the cable while severely restricting cable withdrawal; safety standards entities such as Underwriters' Laboratories often require that such fittings meet stringent anti-withdrawal standards and may also require easy insertion of the cable. Further, the strength and integrity of the cable fitting is believed to be greatly enhanced when at least one end portion is circumferentially uninterrupted, especially the end portion which is snugly fitted to the panel.

Thus, there exists a need in the art for a one-piece, economically molded cable fitting which provides safe, non-destructive one-way restraint of the cable at the panel, includes an uninterrupted end portion of the fitting adjacent the panel for strength, and is capable of passing present safety standards.

SUMMARY OF THE INVENTION

The present invention overcomes the limitations noted above with respect to the prior art single-cable devices by providing a cable fitting device having strain relief features. It can be readily installed to connection boxes or enclosure panels and includes provisions for multiple, as well as single cable attachment and strain relief.

An example of a cable which may be advantageously installed in a box or panel ("panel") is nonmetallic circuit wiring commonly found in house wiring circuits. Panels are normally provided with preformed holes, or have prepunched "knockout" apertures ("apertures"), which are easily removed with hand tools and provide entry apertures for insertion of the cables through the panel. Conventionally, a fitting or box connector is provided which mechanically protects and facilitates securing each of the cables entering the panel.

In a first embodiment, the fitting according to the present invention includes a central passageway divider which cooperates with gripping arms having a camming action about a point determined by a hinge to ensure positive anti-withdrawal gripping of the cable. In an additional embodiment, the fitting includes gripping arms of another configuration with a short central passageway and no divider; it relies on a camming action of the arms with the cable to ensure positive anti-withdrawal gripping of the cable or cables. No divider is required in the additional embodiment.

Basically, the fitting according to a first embodiment of the present invention is formed of a unitary, generally tubular housing having a main passageway therethrough for receiving one or more cables on either side of at least one centrally disposed divider element subdividing the main passageway into two or more channels for the cables. One channel is preferably dedicated for each cable; however, not all of the channels necessarily need be occupied by cable. Individual channels may include also plural cables, size permitting.

According to this first embodiment, at least two arms extend from the housing, which arms are adapted for both outward gripping of the panel and for positive inward gripping of the cable or cables. Two additional extensions are provided solely for gripping the panel, but not the cable.

Flexure of the arms at the hinges permits a camming action of the arms against the divider in the first embodiment of the invention. This camming action results when the cable is withdrawn from the fitting, and ensures a positive gripping of the cable against a corresponding anvil portion of the divider.

The housing may be generally spool-shaped. It has a plurality of longitudinally extending, at least partially arcuate arms terminated with radially outward extending lips or tabs on the exterior thereof. Stop faces are provided for limiting the final insertion depth of the fitting into the panel. The arms are provided with outer first, second, and third tapered shoulder areas for sliding contact with the circumferential rim of the aperture in the panel. The arms provided with cable gripping elements for gripping the exterior insulation or jacket of the cables passing through the housing.

Insertion of the fitting into the panel past the first shoulder to a first, or staging position facilitates insertion of cable into the panel via the passageway. If the fitting is provided with one or more divider elements according to the first embodiment of the present invention, one or more additional cables may be inserted, generally one per cable channel. Multiple cables per channel may also be appropriate. Insertion of the fitting past the second shoulder up to the flanged stop face in the second, locked position causes compression of the internal gripping teeth into gripping relationship with the cable or cables. In the first embodiment, the divider element or elements act as gripper anvils.

Once this first embodiment fitting has been fully installed to the second, locked position, it is more difficult to withdraw from the panel. Alternatively, the fitting may be inserted to the staging position, tapped into the second position, then the cable or cables may be inserted. Positive anti-withdrawal stops may be provided to prevent removal of the fitting from the panel.

Other portions of the housing may be adapted to be struck or clamped to grip or engage the cable in the panel. In both embodiments of the invention, the external portion of the fitting may be adapted to provide a rear-end striking surface. In a further variation of the feature of the invention, one or more rearward facing screwdriver slots may be provided to enable driving the fitting securely into the box with a screwdriver, such as an ordinary electrician's screwdriver. In yet another variation of this feature, the fitting may be affixed to the panel and locked by compression of the gripping arms, such as an ordinary pair of channelled adjustable pliers. In another variation, a plurality of retaining ears are provided which may be clamped together for insertion of the fitting through the panel and then released when the fitting is fully inserted through the panel.

In an additional embodiment of the invention, a substantially shortened housing is provided requiring substantially less mass of material for the fitting. A portion of each of the arms is similarly made relatively flexible between the shortened housing or base and the cable gripping end or head portion. As in the first embodiment, this again facilitates flexure of the arm by a camming type action of the cable gripping head portion relative to the cable and the base. More specifically, the construction of the arms and the shortened housing is such that the arms each include a hinge portion in the manner of a so-called "living hinge" along the interconnecting region between the arm and a circumferentially uninterrupted body portion of the base. The hinge is preferably formed by providing a thinner or tapered cross-section of the arm along part of its length, or by providing one or more reduced cross-sections of the base so as to render the base itself somewhat flexible, or a combination of both.

According to this additional embodiment, at least two arms extend from the base, with a stabilizer section in the shape of a truncated, partial conical segment lying between each of the respective arms to facilitate entry of the fitting into the panel aperture, to fill the panel aperture, and to provide additional stability to the fitting when subjected to lateral forces. Preferably, the fitting is made available in models with two, three, or four cable gripping arms, adapted for gripping the cable and engaging the panel, and allowing the fitting to be smoothly inserted to a fully locked position.

The flexible hinge portion of each arm permits the internal gripping surfaces or teeth on the gripping head to be drawn more tightly against the cable surface when the cable is tensioned in a withdrawal direction, with the toothed portion of the gripping head being rotated about an axis generally defined by the hinge portion. This camming action causes other surface areas of the cable to contact one or more of the other gripping heads, which are thereby also cammed around into firmer gripping contact with the cable to more tightly grip and clamp the cable against withdrawal from the fitting, and thus from the panel.

The spacing between the gripping heads provides an aperture area or passage through the fitting for cable insertion between the innermost gripping surfaces of the heads. The passage is sized such that a cable can be easily inserted from the entry side of the fitting even where the cross-sectional area of the cable is somewhat larger than the cross-sectional area of the passage. The hinge portions are sufficiently flexible so as to permit rotation of the arms and gripping heads away from the cable to thereby enlarge the cable entry opening. Once the cable has passed through the passage the above-described camming action will cause the gripping head to tightly grip the cable and prevent its withdrawal from the fitting.

An important feature of the invention according to this additional embodiment is the provision of internal gripping teeth arranged in a particular configuration which has been found to be effective in anti-withdrawal gripping of the cable surface upon teeth-to-cable contact in the withdrawal mode. The toothed face of the gripping head may be either curved or flat and the curved or flat toothed face may have an increasing displacement from the centerline axis of the fitting along the axial dimension extending from the circumferential base end toward the gripping heads. That is, for example and not limitation, the teeth are spaced apart along diverging planes (flat-faced or planar heads) or diverging curves (curved-face heads).

The fitting is constructed as a unitary, one-piece structure made of an insulating material, such as a plastic material. Preferably, the fitting is injection molded of plastic.

A first advantage of the invention is the provision of a cable fitting for securing multiple nonmetallic sheath cables to the panel.

Another advantage of the present invention is the provision of an inexpensive, easily manufactured fitting having internal cable gripping features.

Yet another advantage of the invention is the provision of structure on the fitting which permits multiple methods for locking the fitting to the panel.

An important advantage of the additional embodiment of the invention resides in its relatively short longitudinal extension, permitting use in more cramped quarters.

Other objects, features, and advantages of the invention will be apparent from the following description and claims and are illustrated in the accompanying drawings, which disclose by way of example the principles of the invention and the manner contemplated by the inventors for carrying out the invention.

BRIEF DESCRIPTION OF THE DRAWING FIGURES

FIG. 12 is a top plan view of a two-arm fitting according to the additional embodiment of the invention;

FIG. 13 is a top plan view of a three-arm fitting according to the additional embodiment of the invention;

FIG. 14 is a top plan view of a four-arm fitting according to the additional embodiment of the invention;

FIG. 15 is a top plan view of an alternative four-arm fitting according to the additional embodiment of the invention;

FIG. 16 is a side elevation view in cross-section taken along line 16—16 of the fitting of FIG. 12;

FIG. 17 is a side elevation view in cross-section taken along line 17—17 of the fitting shown in FIG. 12;

DETAILED DESCRIPTION OF THE INVENTION

Figure 1:
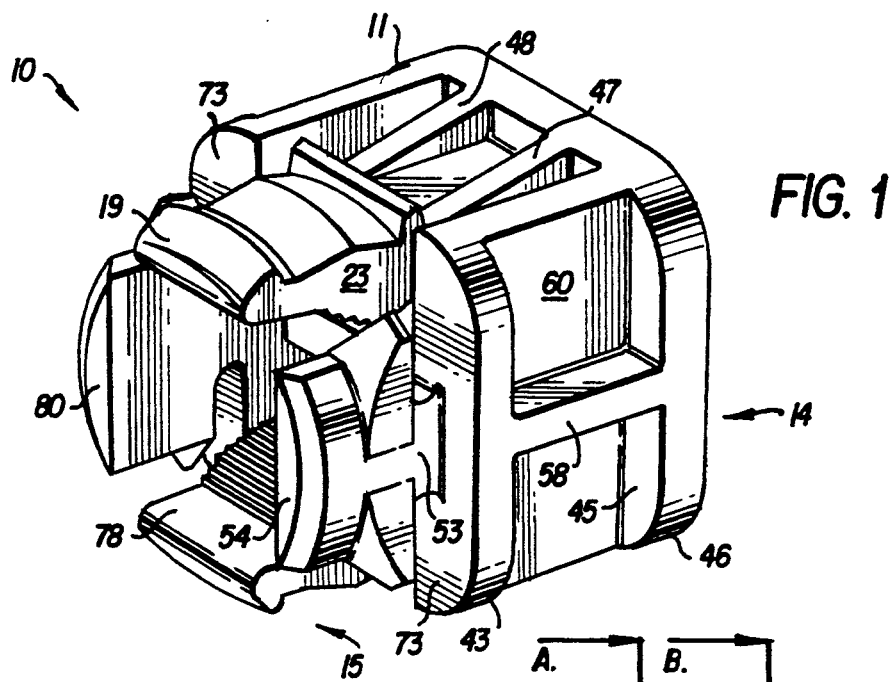
FIG. 1 is a perspective view of the first embodiment of the present invention as viewed from the attachment or proximal end thereof.
Figure 2:
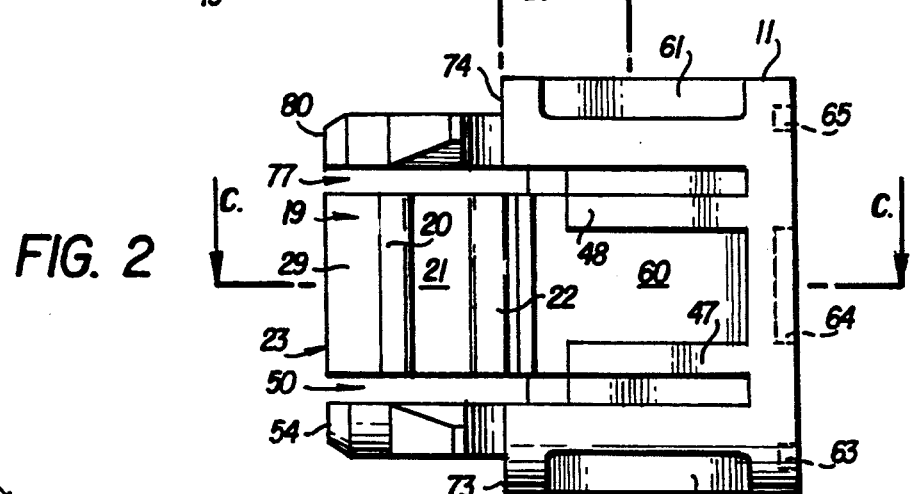
FIG. 2 is a plan view of the first embodiment of the invention with section lines A—A, B—B, and C—C indicated.
Figure 3:
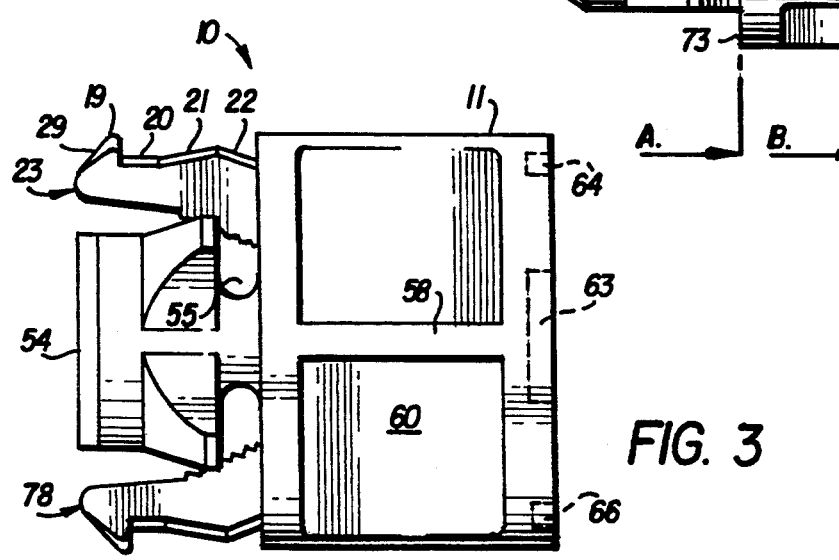
FIG. 3 is a side view of the first embodiment of the invention.

There is shown in FIGS. 1 through 11 a fitting 10 constructed in accordance with the first embodiment of the present invention. From housing 11, a plurality of cantilevered arms 23, 78 extend longitudinally outward, including at their extreme ends first tabs or lips 19, which may be radially extending lips having tapered or sloped insertion faces 29 and stop or retaining faces 13 (FIG. 3). Housing 11 may be spool-shaped and have an elongated tubular central portion, or may be of such similar shape as is readily manufactured (such as by injection molding). The embodiment of FIGS. 1 through 11 has a generally rectangular cross section with rounded corners for easy manufacture. Lips 19 may be arcuately curved along their insertion faces 29 to facilitate entry through a round aperture in a panel. Housing 11 is adapted to receive cable at a first, distal wire entry end 14 and which cable exits fitting 10 at a wire exit or proximal end generally indicated by reference numeral 15.

Figure 8:
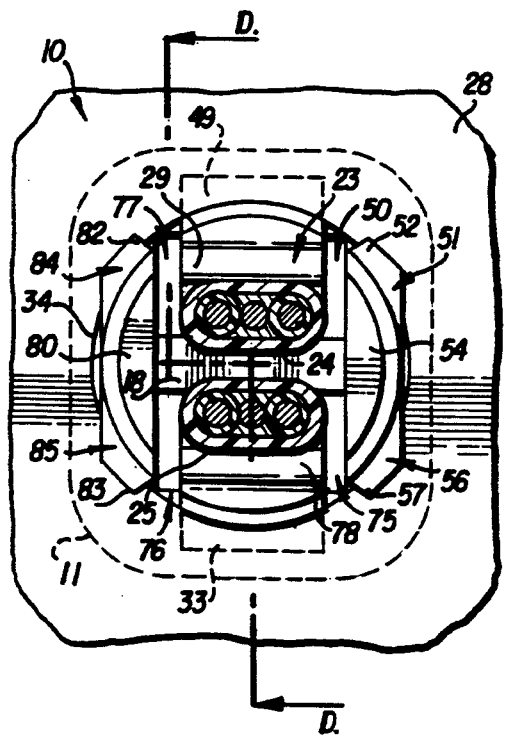
FIG. 8 is a proximal end view of the first embodiment of the invention containing a pair of conventional NM-type cables, as seen from inside the panel.

The arms 23, 78 may for the purposes of the illustrated example be comprised of two generally parallel faces displaced slightly from a plane through the central vertical axis of the fitting 10 as shown, and further may include a plurality of outward faces 20, 21, 22 (FIGS. 2 and 3) and interior face portions. The interior face portions may include a plurality of transverse serrations or gripping teeth 17. These teeth 17 engage the cables 24, 25 when the cables are withdrawn. More specifically, the arms 23, 78 are positioned such that they contact cables 24, 25 by teeth 17. Flexure of the arms permits them to rotate in a camming action into firmer gripping contact with the cables whenever the cables are withdrawn, individually or collectively. The arms are not short enough to permit them to pass backward through the central aperture, thus they lock the cable more tightly as the cable is withdrawn, resulting in a camming-lock action. In use, the fitting 10 according to the first embodiment of the invention secures at least one cable 25 (FIGS. 8 through 11) within housing 11 and to an panel 28 through, for example, an aperture 34 in panel 28. FIG. 8 shows a pair of typical NM electrical cables 24, 25 installed in fitting 10 through a panel 28 via an aperture 34.

The housing 11 incorporates a number of structural features, including fitting 10 special front and rear flanges 43, 46. Flange 43 has a thickness dimension between front and rear surfaces 42, 41 (FIG. 1) and flange 46 has a thickness dimension between front and rear surfaces 45 and 44 (FIG. 1). A central passageway 31 is formed by fitting 10 drum 60, which has a thickness dimension and may be round, a rounded square or rectangle, a (preferably regular) polygon or other suitable shape. Joining drum 60 and front and flanges 43, 46 together are a plurality of structural support members such as longitudinal members 58, 61. Member 61 is best seen in FIG. 2. These members 58, 61 may be molded integral with and connect the front surface 45 of flange 46 to the rear surface 41 of flange 43, as well as to the outer surface of drum 60, and may also be formed of an insulating material. A thermoplastic material may be preferred. Such materials include polyesters and polyolefins and particularly polyethylenes and polypropylene polymers. Flame retardant polyester or flame retardant polypropylene materials of the type meeting Underwriters' Laboratories Section 94-1 rating are preferred. Arms 23, 78 extend from inclined body longitudinal portions foiled of similar support members. In the illustrative example described herein, a pair of inclined longitudinal members 47, 48, joined at least partially integral with the surface of drum 60 provide a foundation and structural support for arm 23. More particularly, members 47, 48 are joined with a portion of flange 46 and drum 60. These portions form a reinforced structure which provides stiffness to arm 23 and also facilitates transfer of forces applied to housing 11 rear flange 46 rear surface 45 to projecting arms 23, 78.

Figure 9:
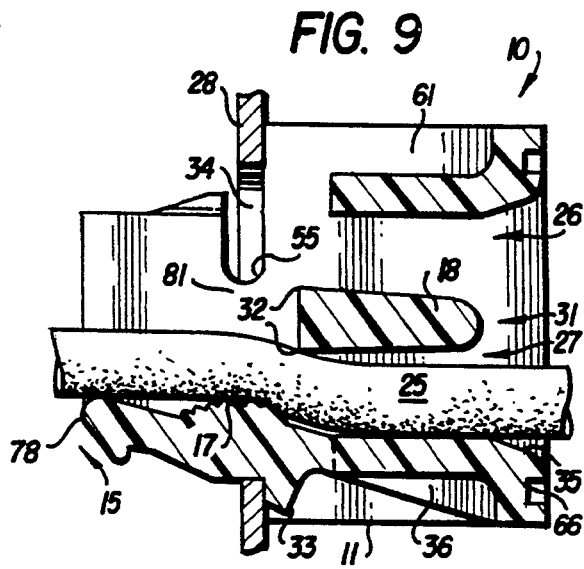
FIG. 9 is a cross-section view of the first embodiment of the invention containing an NM cable taken at section line D—D.
Figure 10:
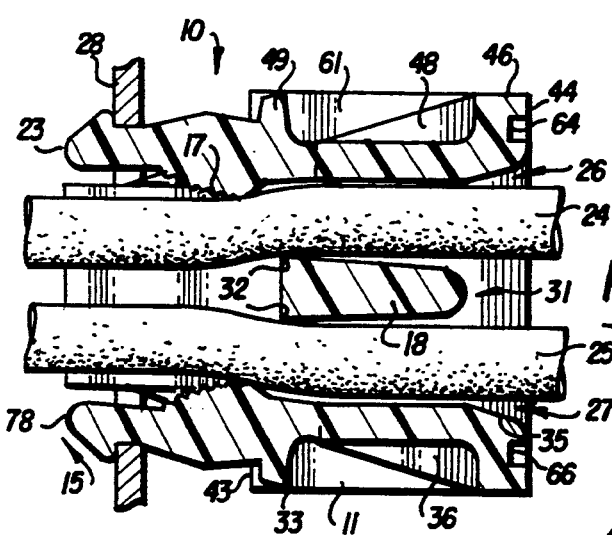
FIG. 10 is a sectional view of the first embodiment of the invention containing a pair of typical NM cables and installed into the panel to a first, or staging position taken at section line C—C.
Figure 11:
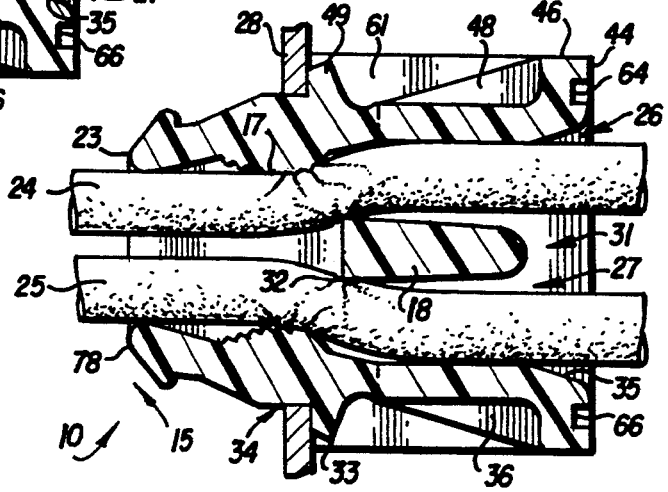
FIG. 11 is a sectional view of the first embodiment of the invention containing a pair of typical NM cables and installed into the panel to a second, or fully installed position taken at section line C—C.

One of the bottom inclined longitudinal support members 36 forming a part of housing 11 and arm 78 of the first embodiment is seen in FIGS. 9 through 11 at the bottom of housing 11. Flange 43 is divided around its periphery into substantially similar partial sections 73, 74 by arms 23, 78 and passageway 31, in which sections 73, 74 are separated from top arm 23 by channels 50, 77. These channels in turn may extend slightly beyond the housing 11 and flange 43, into drum 60 and at least partially towards flange 46. This combination enhances free cantilevered movement of arm 23. Similarly, a pair of like channels 75, 76 separate sections 73, 74 from arm 78 which lies therebetween at the bottom. Projecting frontwards from each of the front sections 73, 74 are notched retainer elements, generally attached to semilunar portions 54 and 80, which may be chamfered around the periphery thereof. Semilunar portions 54, 80 are joined to housing 11 respective flange 43 sections 73, 74 front surfaces such as surface 42 by stems, such as stems 53, 81 (see FIGS. 2 and 9) adjacent to the notches, illustrated by notch 55 (FIG. 9).

Figure 7:
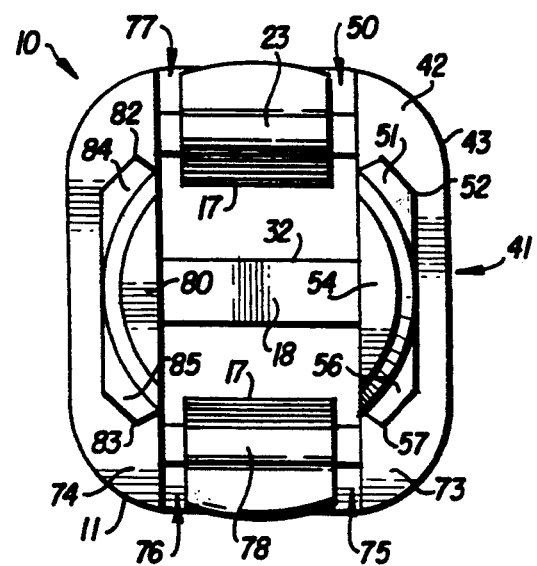
FIG. 7 is an end view of the first embodiment of the invention as seen from the front or proximal end of the device.

Extending rearward from semilunar portions 54, 80 are (respectively) left upper retaining tooth 82, left lower retaining tooth 83, and right upper and lower retaining teeth 52, 57 (see FIG. 7 and 8). These teeth 52, 57 and 82, 83 may have frontward facing sloped surfaces, best shown as surfaces 51, 56 on teeth 52, 57. By way of illustration, surfaces 51, 56 may be shaped to facilitate entry into a panel 28 aperture 34; the partial undercut at notch 55 (see FIGS. 3 and 9) from sections 73, 74 provides added flexibility during installation. Similar notches underlie teeth 57, 82, and 83. Teeth 82, 83 face surfaces 84, 85 are best seen in FIG. 7. Teeth 52, 57, 82, 83 inhibit withdrawal of fitting 10 when it is fully installed. Note that semilunar portions 54, 80 can be sized so as to prevent easy insertion through apertures which are too small and can also be used to stabilize the fitting 10 during installation at the "staging" position, described hereinafter.

A plurality of grooves or notches 63, 64, 65, 66 (FIG. 6) in flange 46 surface 44 enable application of drive force, as by a screwdriver or such equivalent tool.

Figure 4:
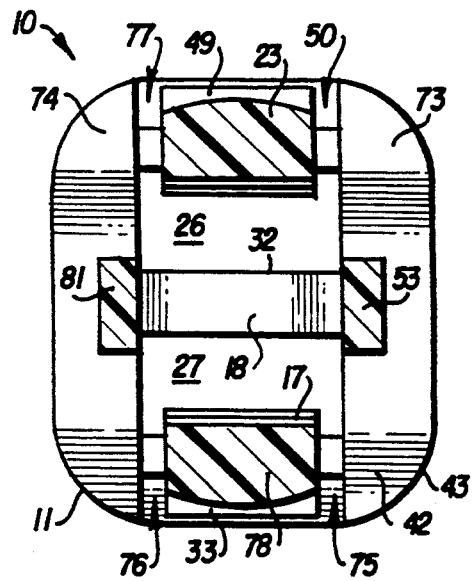
FIG. 4 is a cross-sectional view of the first embodiment of the invention taken at line A—A, and viewed towards the rear or distal end thereof.

From the proximal end 15 of fitting 10 (FIG. 3), a section A—A (in the plane of surface 42) is viewed in FIG. 4 towards distal end 14 of housing 11 of the fitting 10 according to the first embodiment of the present invention. The squared, spool-like shape (in this example) of housing 11 can be seen clearly in FIG. 4 with both front surface 42 of flange 43 sections 73, being shown surrounding passageway 31 (passageway 31 is best viewed in FIGS. 9 through 11), which is divided into two channels 26, 27 in this illustrative example by divider 18. Divider 18 is partially sectioned in this view. Divider 18 terminates in an anvil 32; it is recessed behind plane A—A. Alternatively, stems 53 and 81 may be partially joined by elongation of divider (not shown) for further strength and support if required. Additional gripping teeth may be provided at anvil 32 to more securely grip a cable.

Figure 5:
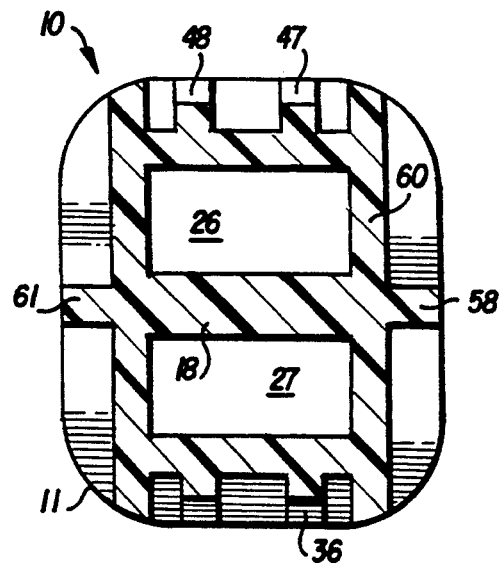
FIG. 5 is a cross-sectional view of the first embodiment of the invention taken at line B—B and viewed towards the rear or distal end thereof.

A further section B—B of the first embodiment housing 11 is shown in FIG. 5. Interior details of the housing 11 are shown in this view. Again, channels 50, 75, 76, 77 are shown adjacent arms 23, 78, separating the arms and also partially separating members 47, from the adjacent side portions of the drum 60. Divider 18, molded integral with drum 60 and members 58, provides structural rigidity and helps maintain the integrity of housing 11. Passageway 31 is divided into two channels 26, 27 bounded by drum 60, arms 23, 78, and divider 18.

Figure 6:
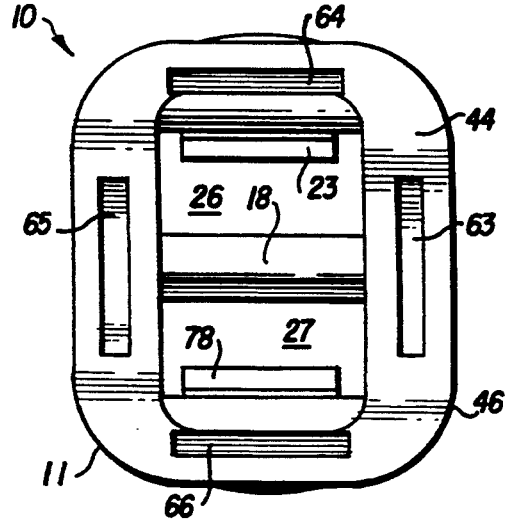
FIG. 6 is an end view of the first embodiment of the invention as seen from the rear or distal end of the device.

Viewed from the distal end 14 of housing 11 as shown in FIG. 6, the drive notches 63, 64, 65, 66 are clearly visible in the rear surface 44 of flange 46. Also shown is passageway 31, as divided into two channels 26, 27 by divider 18. Interior portions of arms 23, 78 are visible, including one of the teeth 17 of the two arms 23, 78.

Visible in proximal end 15 view (FIG. 7) is housing 11 and respective left and right sections 73, 74 of flange 43, including the front surface 42 thereof (the rear surface 41 is seen in FIG. 2). Anvil 32 is shown terminating divider 18 (visible in FIG. 4) to separate the passageway 31 into first and second channels 26, 27.

Retaining teeth 52, 57, 82, and 83 are readily visible in FIG. 7 as are surfaces 51, 56, 84, 85, respectively. Also seen are channels 50, 75, 76, 77, dividing the flange portions 73, 74 along sides or arms 23, 78.

A vertical longitudinal split sectional view along line D—D of FIG. 8 provides a view such as FIG. 9, which is further explained in detail in combination with FIGS. 10 and 11. The passageway 31 is seen at distal end 14; it is split into channels 26, 27 by divider 18, the proximal termination of which functions as an anvil in cooperation with teeth 17. With fitting 10 fully inserted as in FIG. 9, cable 25 is firmly locked in channel 27 as shown; the section view is offset at the divider in FIG. 9 such that channel 26 and cable 24 are not shown in this view (see FIGS. 10 and 11). Tapered wire entry 35 facilitates insertion of wire into the fitting 10 and avoids wear caused by sharp edges.

In use, the arms 23, 78 may be inserted partially through an aperture 34 in panel 28 (see also FIGS. 9-11). Upon insertion, the insertion faces 29 of lips 19 facilitate easy entry of the arms into the panel 28 through aperture 34. Details of the arms 23, 78 can be seen in FIG. 3. The arms 23, 78 are generally of the same material as the housing 11; being cantilevered, they flex to permit entry into the panel 28 to a staging position (illustrated in FIG. 10) from which the device 10 cannot easily be withdrawn; lip 19 stop face 13, abutting the panel 28, prevents such withdrawal.

The view of fitting 10 shown in FIG. 10 specifically illustrates insertion of the fitting to the first position. Behind lip 19 stop face 13 along the length of arm 23 is a first outward face portion 20, which may preferably be arcuate; this face portion 20 is thus adapted for fitting the inside of the aperture 34 and should preferably be greater in length than the expected thickness of the panel 28 at aperture 34. Following face 20 along the arm 23 towards the housing 11 is an outwardly inclined arcuate ramp or intermediate face 21, followed by a shorter inwardly inclined arcuate ramp face 22, which for the present preferred embodiment illustrated, is preferably at least as long as the panel 28 is thick. Lip 49 portion of arm 23 (see FIGS. 10 and 11) provides an additional stop for preventing insertion beyond flange 43. Lip 33 on arm 78 functions similarly. A plurality of retaining teeth 52, 57, 82, 83 are spaced from the housing 11 by a gap illustrated by notch 55 of FIG. 3. The dimension of the notch should be equal to or greater than the thickness of the panel 28 at the aperture 34 location.

As arms 23, 78 are inserted further into panel 28, face 22 is compressed until it is approximately of the same outer diameter as the inner diameter of aperture 34. The retaining teeth 52, 57, 82, 83 are shaped to extend to a diameter greater than that of aperture 34. They may be partially cantilevered or undercut and tapered as shown in this example, from the proximal end 15 towards the main housing end of the fitting 10 to ease insertion flexure and locking. It is expected that the fitting must ordinarily be at least slightly forced the remaining distance through the aperture 34. Housing 11 is provided with an at least partial circumferential flange 43 to prevent housing 11 from being forced through aperture 34 into the panel. This flange 43 may be an integral or separate part of housing 11. The final forced insertion of the fitting 10 into aperture 34 may require manually applied force, as by striking the fitting 10 with a small hammer. The slight hammering force may be applied directly or via a screwdriver or other tool. Note that the fitting may also be inserted fully into the panel mounting hole, then the cables inserted.

One or more dividers 18 may be included within passageway 31 to divide it 31 into discrete channels 26, 27 for receiving the wires or cables 24, 25. In the present first illustrative embodiment a single divider 18 is shown, forming two channels 26, 27 through which cables 24, 25 have been inserted. Here, divider 18 is rounded at the wire entry end 14 to facilitate cable 24, 25 insertion. The wire exit end 15 of divider 18 is terminated to form an anvil 32 approximately opposite teeth 17 of arms 23, 78.

As the fitting 10 is inserted via arms 23, 78 into the panel, the aperture diameter forces arms 23, 78 inward in the manner of a fulcrum such that the gripper teeth 17 area is forced firmly into contact with the divider 18 at terminating anvil 32. The cable 25 is thereby firmly and forcibly compressed by the fulcrum action between teeth 17 and anvil 32. For this reason, it is preferable that the housing 11, teeth 17, and anvil 32 be of an electrically non-conductive material. Numerous commercially available plastics, including Underwriters' Laboratories Section 94-1 approved ABS (acrylonitrile butadiene styrene), polyesters and polyolefins, including polyethylene and polypropylene are suitable. These materials may be easily molded into the complex shape required for fitting 10. It is further preferable that the dimensions of the fitting 10 arms 23, 78, teeth 17, divider 18, and anvil 32 be selected to enable firm compression of the cables 24, 25 without damaging same, and further that these dimensions be selected to meet this compression limitation for a range of cable thicknesses and cable sizes, giving due regard to the manufacturing tolerances inherent in the manufacture of the panel 28 aperture 34 diameters, cable 24, 25 size variations, and of the fitting 10.

In use with the fitting 10 of this invention, the cable or cables are brought through an aperture in the panel and both installed through and mechanically fastened to the panel to guard against unintentional removal of the wires or cables. In the first embodiment, each cable is passed via at least one channel in the fitting into the box or panel. The cable is secured to the fitting between inward directed gripping teeth on the arms between the arms and a terminating anvil portion of a divider. The fitting, in turn, is secured to the panel by a plurality of positive locking teeth such as lips on the arms. Sloping faces on the arms facilitate resilient entry of the fitting into the panel, enabling the fitting to be locked in place, and assuring that it cannot readily be withdrawn.

In FIGS. 12-21 there are shown several configurations of cable fittings constructed in accordance with the additional embodiment of the present invention. The preferred cable fitting according to this additional embodiment includes a base or housing portion and may have two, three, or four arms although more arms may be used. At least some of the arms include panel gripping sectors adjacent their respective bases and terminate in enlarged gripping head portions having inwardly facing teeth.

The two-arm fitting 110 shown in FIGS. 12 and 16-18 is a one-piece molded plastic element comprising a base portion 112 from which integrally extends two oppositely disposed gripping arms 114, 116 and two truncated conical segment portions 118, 120 which are also disposed opposite one another and between the gripping arms. The arms 114, 116 and conical portions 118, 120 define a central, cable-receiving passage 122 disposed along the central axis A of the fitting 110.

Base portion 112 is relatively short in its axial length and comprises a generally circular or ring-shaped component with which the arms 114, 116 and conical portions 118, 120 are integrally formed. Flange portions 113, 115 extend radially outwardly from the base 112 adjacent each conical portion 118, 120 over an arc of about 120°-135° for a purpose to be described.

Gripping arms 114, 116 each comprise a hinge portion 124 and a gripping head portion 126 having a toothed face 128 confronting the cable passage 122. Toothed face 128 is provided with a plurality of individual teeth 130 for gripping a cable (not shown) which passes through the passage 122. As best seen in FIG. 16, the toothed faces 128 of the gripping heads 126 are inclined outwardly at an angle with respect to the axis A of the fitting 110 to facilitate the gripping action of the heads in a manner to be described. The gripping head portions 126 are connected to the hinge portions 124 in a cantilever fashion so as to provide a relatively large cable entry receptacle 132 adjacent the base portion 112 of the fitting 110.

The outermost surfaces 134 of the heads are preferably conically shaped so as to provide, in cooperation with the outermost conical surfaces of the conical portions 118, 120 a plurality of guide surfaces for guiding the fitting 110 easily into an aperture B a junction box or enclosure panel P (FIGS. 16–17) into which a cable is to be inserted. The panel P is captivated between the flange portions 113, 115 and a pair of lips or shoulders 136 projecting outwardly from the heads 126.

The hinge portions 124 of the gripping arms 114, 116 are constructed to flex or "hinge" about a flexure axis adjacent the base portion 112 such that the gripping heads 126 can be flexed toward the axis A to reduce the size of the passage 122. Preferably, the hinge portions are sufficiently flexible that the confronting toothed faces 128 of the gripping heads 126 are engageable with one another. The flexibility of the hinge portions 124 is dependent, among other things, on their cross-sectional area and the flexibility of the material from which the fitting 110 is molded. The thickness and flexibility of the base portion 112 may also affect the degree of flexure of the arms 114, 116. As best seen in FIG. 16, the hinge portions 124 taper from the gripping heads 126 to the base 112 to a smaller or reduced cross-sectional area to increase the flexure of the arms 114, 116.

The fitting 110 is employed in a junction box or enclosure panel in the following manner. A panel P of the junction box or enclosure is provided with an aperture B through which it is desired to insert a cable, such as an insulated electrical cable. A fitting 110 of an appropriate size relative to the diameter of aperture B is placed against the aperture B with the outer conical surfaces 134 of the arms 114, 116 engaging the edge of the aperture B. The fitting 110 is then forced by the base portion 112 into the aperture B causing the arms 114, 116 to flex inwardly toward the axis A and the truncated conical segments 118, 120 to also engage the edge of the aperture B. Further inward force against the base portion 112 will permit the lips 136 to pass through the aperture B until the flange portions 113, 115 engage the outer side of panel P. Simultaneously, the arms 114, 116 flex outwardly to the position shown in FIG. 16 and the lips 136 engage the inner side of panel P. In this way, the panel P is captivated between the flange portions 113, 115 and the lips 136 and the fitting 110 is releasably retained in the aperture B. If desired, a narrow ridge 138 (FIG. 17) may be provided circumferentially on the conical segments 118, 120 to make the engagement between the fitting 110 and the aperture B more snug.

After the fitting 110 has been installed in the aperture B of panel P, the free or cut end of a cable (not shown) is introduced into receptacle 132 along the axis A of the fitting and is pushed through passage 122 in the direction of arrow C (FIG. 16). To the extent the cable is larger than the smallest dimension between the toothed faces 128, the gripping heads 126 will flex outwardly about hinge portions 124 to permit the cable to pass through the passage 122 and into the interior of the junction box or enclosure of which the panel P forms a part. The teeth 130 of the gripping heads 126 grip the cable jacket in a manner to prevent withdrawal of the cable from the fitting by a camming action of the gripping heads according to an important feature of the invention.

If withdrawal of the cable from the fitting is attempted, the teeth 130 grip the cable tightly because the gripping heads 126 are caused to be rotated or cammed by the cable toward the axis A of the fitting and to thereby reduce the size of the passage 122. As the withdrawal force increases, the gripping heads 126 are cammed toward the cable in an ever-tightening manner and a greater number of teeth 130 come into engagement with the cable until all teeth are engaged. The lips 136 on the outermost periphery of the gripping heads 126 prevent the fitting 110 itself from being pulled from the aperture B in the panel P when a withdrawal force is applied to a cable passing through the fitting.

Figure 21:
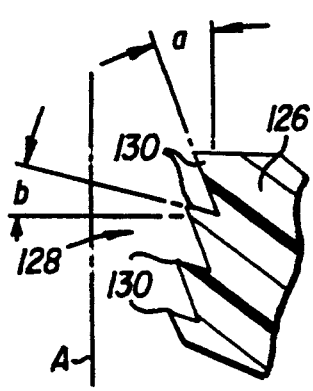
FIGS. 21 and 22 are enlarged detail views showing two configurations of the teeth of the gripping heads.
Figure 22:
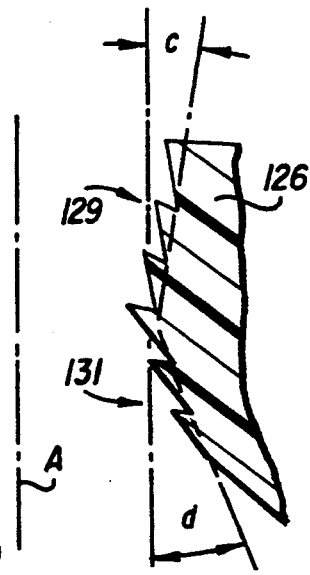

Preferred configurations of the teeth 130 are shown in the enlarged details of FIGS. 21 and 22. As shown in FIG. 21, each tooth 130 on toothed face 128 except the lowermost tooth is inclined toward the axis A by an angle a and each tooth 130 except the uppermost tooth is inclined upwardly from a plane perpendicular to axis A by an angle b. In a particularly effective gripping tooth configuration the angle a is about 15° and the angle b is about 10°. FIG. 22 illustrates another configuration of the teeth 130 of the gripping heads 126. In this configuration, the teeth 130 are arranged on two faces 129, 131 of the gripping heads 126 which diverge at different angles c and d from the axis A of the passage through the fitting. The faces 128 and 129, 131 may be planar as shown in FIGS. 12–14 and 16–19 or curved as shown in FIGS. 15 and 20. Although two particularly effective tooth configurations have been specifically shown and described herein, it should be understood that other tooth configurations are possible within the scope of the present invention.

Figure 18:
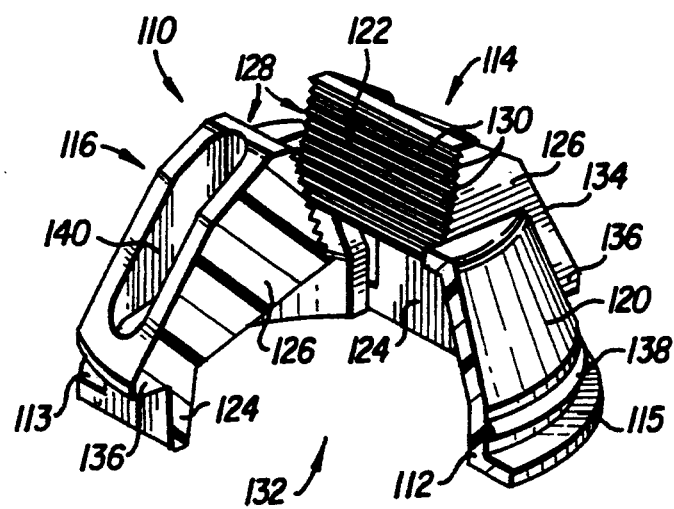
FIG. 18 is a perspective view, partly in cross-section, of the two-arm embodiment of the invention shown in FIGS. 12, 16 and 17.

As shown in FIG. 18, the gripping arms 114, 116 may be molded with one or more cavities 140 in the head portions 126. Such cavities advantageously minimize shrinkage distortion of the plastic molded fitting and reduce the total mass, and therefore saves cost, of the plastic used to mold the fitting. In high volume production, such cost savings is significant.

It should also be understood that while the fitting of the present invention is illustrated and described as being adapted to be inserted in circular apertures in a junction box of enclosure, other aperture shapes and configurations are contemplated, including polygonal (square, rectangular, triangular, etc.) and curvilinear (oval, elliptical, etc.).

Figure 19:
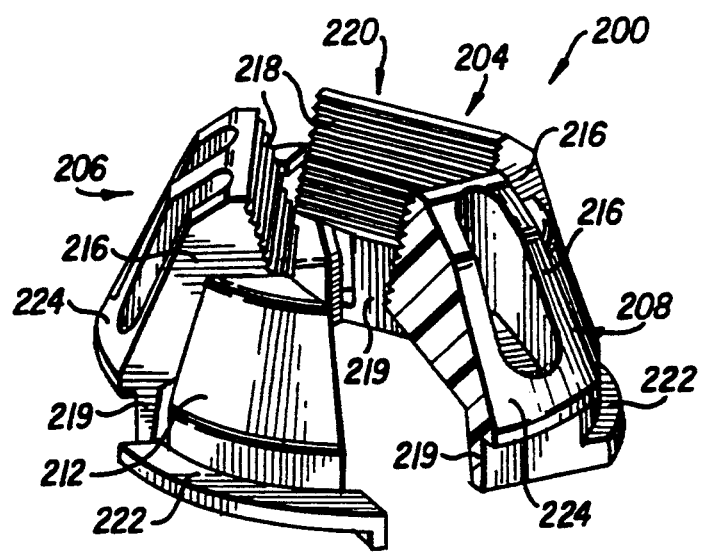
FIG. 19 is a perspective view, partly in cross-section, of the three-arm embodiment of the invention shown in FIG. 13.
Figure 20:
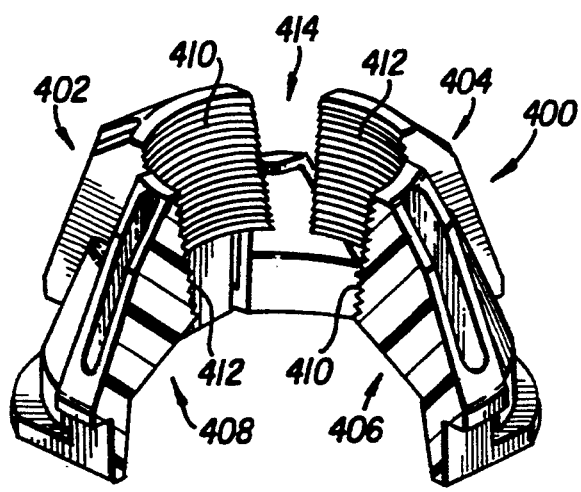
FIG. 20 is a perspective view, partly in cross-section, of the four-arm embodiment of the invention shown in FIG. 15.

Referring now to the three-arm fitting 200 shown in FIGS. 13 and 19, the fitting comprises a base portion 202 to which are integrally formed three gripping arms 204, 206, 208 preferably arranged at 120° intervals between the arms. The gripping arms 204, 206, 208 are each provided with a gripping head 216 having a toothed gripping face 218 and a hinge portion 219 (FIG. 19). The gripping faces 218 define a generally triangular-shaped passage 220 which is especially suitable for receiving a cable with a circular cross-section.

The base portion 202 of fitting 200 comprises three flange portions 222 which are adapted to engage the periphery surrounding a panel aperture in the same manner as the flanges 113, 115 of the fitting 110 shown in FIG. 17. Similarly, the gripping heads 216 are each provided with a lip 224 for locking or captivating a panel between the flanges 222 and lips 224. The fitting 200 operates in substantially the same way as the fitting 110 to prevent withdrawal of a cable from the fittings and to secure the fitting into an aperture in a panel.

FIG. 14 illustrates a four-arm fitting 300 having a base portion 302 to which are integrally formed four gripping arms 304, 306, 308, 310 arranged at 90° intervals and four truncated conical segments 312, 314, 316, 318 also arranged at 90° intervals. Each arm is provided with a gripping head 320 or 322. Gripping heads 320 are oppositely disposed and have a greater lateral dimension than the oppositely disposed gripping heads 322. Gripping heads 320, 322 are provided with toothed gripping faces 324, 326, respectively, which define a rectangular cable passage 328. Operation of the fitting 300 is similar to the operation of fittings 110 and 200.

Now referring to FIGS. 15 and 20, an alternate construction of the four arm fitting is illustrated which is designated generally by reference numeral 400. In this construction, the gripping arms 402, 404, 406, 408 are similar to the arms 304, 306, 305, 310 of FIG. 14, however, the toothed gripping faces 410, 412 are curvilinear rather than flat faced or planar and thus define an oval or elliptical passage 414. Otherwise, the fitting 400 operates in substantially the same manner as described above in connection with fitting 110.

Those skilled in the art will appreciate that the gripping faces of any of the fittings 110, 200 or 300 may also have a curved shape to form a passage with a circular, oval, elliptical, or other curvilinear shape.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A one-piece fitting for securing a cable and the like to a panel, comprising:
   a) a first free end and a second end, said first free end having a panel-engaging base with an uninterrupted perimeter, and a passage therethrough for receiving the cable, said passage having an axis a plurality of arms extending from the base toward said second end;
   b) outwardly-facing means on said fitting for securing said fitting to said panel;
   c) a plurality of arms cantilevered from said base and extending from said first free end toward said second end; and
   d) a plurality of inwardly-facing cable gripping teeth on each arm positioned to secure the cable against withdrawal from said fitting without substantially inhibiting cable entry into said fitting, the cable gripping teeth being formed on said arms, wherein said teeth are arranged in rows and wherein the faces of each successive row of said teeth diverge radially away from the axis of said passage from said first free end toward said second end.

2. The fitting of claim 1, wherein each arm includes an enlarged head portion, said teeth being formed on the internal surfaces of each enlarged head portion and being adapted to grip the cable in the passage through the fitting.

3. The fitting of claim 2, wherein each respective arm includes hinge means for hingedly and resiliently mounting said respective arm to said base.

4. The fitting of claim 3, wherein the hinge means are adapted to flex sufficiently to enable camming action rotation of the respective gripping head associated therewith.

5. The fitting of claim 3, wherein said hinge means comprises a reduced cross-section of said respective arm.

6. The fitting of claim 1, wherein the successive rows of said teeth extend to an imaginary plane which is disposed at an angle of from about 5 degrees to about 25 degrees relative to said axis.

7. The fitting of claim 1, including means extending from said base, disposed between adjacent arms, for defining portions of said passage.

8. The fitting of claim 1, further including a plurality of truncated conical segments attached to said base and positioned between said arms.

9. The fitting of claim 1, wherein said base includes a flange portion, said flange portion being sized to limit the insertion of said fitting into said panel.

10. The fitting of claim 1, wherein said fitting is integrally molded in one-piece of an electrically insulating polymer material.

11. The fitting of claim 1, wherein said gripping teeth are arranged in a planar face of each arm.

12. The fitting of claim 1, wherein said gripping teeth are arranged in a curvilinear face of each arm.

13. The fitting of claim 1, wherein said means for securing said fitting to said panel comprises a flange portion on said base and lips on said arms, said flange portion and lips being adapted to engage said panel therebetween.

14. A one-piece fitting for securing a cable and the like to a panel, comprising:
   a) a first free end and a second end, said first free a panel-engaging base with an uninterrupted perimeter, and a passage therethrough for receiving the cable, said passage having an axis a plurality of arms extending from the base toward said second end;
   b) outwardly-facing means on said fitting for securing said fitting to said panel;
   c) a plurality of arms cantilevered from said base and extending from said first free end toward said second end; and
   d) a plurality of inwardly-facing cable gripping teeth on each arm positioned to secure the cable against withdrawal from said fitting without substantially inhibiting cable entry into said fitting, the cable gripping teeth being formed on said arms, wherein said teeth are arranged in rows, and wherein the faces of each successive row of said teeth diverge radially away from the axis of said passage from said first free end toward said second end, wherein said gripping teeth extend to at least two imaginary planes inward of each arm.

15. A unitary fitting for securing cable and the like to a panel, comprising:
   a) a first free end and a second end, said first free end having a panel-engaging base and a passage extending through said fitting for receiving the cable, said passage having an axis;
   b) outwardly-facing means on said fitting for securing said fitting to said panel;
   c) a plurality of arms cantilevered from said base and disposed about said passage, each arm including hinge means for hingedly and resiliently mounting said arms to the base, each arm including an enlarged head portion; and
   d) a plurality of inwardly-facing cable gripping teeth positioned to confront and grip a cable in the passage to secure said cable against withdrawal from said base, said cable gripping teeth being formed on said enlarged head portions of said arms, and said teeth being arranged in rows such that the faces of each successive row of said teeth diverge radially away from the axis of said passage from said first free end toward said second end.

16. The fitting of claim 15, wherein the hinge means are adapted to flex sufficiently to enable camming action rotation of the respective gripping heads associated therewith.

17. The fitting of claim 15, further including a plurality of truncated conical segments attached to said base and positioned between said arms.

18. The fitting of claim 15, wherein said fitting is molded in one-piece of a plastic material.

19. The fitting of claim 15, wherein said hinge means comprises a reduced cross-section of each arm.

20. A one-piece fitting for securing a cable and the like to a panel, comprising:
  a) a first free end and a second end, said first free end having a panel-engaging base with an uninterrupted perimeter, a passage therethrough for receiving the cable, said passage having an axis and a plurality of arms extending from the base toward said second end;
  b) outwardly-facing means on said fitting for securing said fitting to said panel;
  c) a plurality of arms cantilevered from said base and extending from said first free end toward said second end, each respective arm including a gripping head and hinge means for hingedly and resiliently mounting said respective arm to said base to enable camming action rotation of the respective gripping head associated therewith; and
  d) a plurality of inwardly-facing cable gripping teeth positioned to secure the cable against withdrawal from said fitting, a plurality of said cable gripping teeth being formed on each of said heads, whereby a withdrawal force applied to said cable results in a pressure which, through said camming action rotation, creates a clamping force on said cable that prevents the cable from being withdrawn from said passage, wherein said teeth are arranged in rows, and wherein the faces of each successive row of said teeth diverge radially away from the axis of said passage from said first free end toward said second end.

* * * * *